United States Patent
Wu et al.

(10) Patent No.: US 11,410,117 B2
(45) Date of Patent: Aug. 9, 2022

(54) SYSTEM AND METHOD FOR CONTROLLING INVENTORY DEPLETION BY OFFERING DIFFERENT PRICES TO DIFFERENT CUSTOMERS

(71) Applicant: ORACLE INTERNATIONAL CORPORATION, Redwood Shores, CA (US)

(72) Inventors: Su-Ming Wu, Waltham, MA (US); Andrew Vakhutinsky, Sharon, MA (US)

(73) Assignee: Oracle International Corporation, Redwood Shores, CA (US)

( * ) Notice: Subject to any disclaimer, the term of this patent is extended or adjusted under 35 U.S.C. 154(b) by 625 days.

(21) Appl. No.: 16/167,900

(22) Filed: Oct. 23, 2018

(65) Prior Publication Data
US 2019/0122176 A1 Apr. 25, 2019

Related U.S. Application Data

(60) Provisional application No. 62/576,289, filed on Oct. 24, 2017.

(51) Int. Cl.
*G06Q 10/08* (2012.01)
*G06Q 30/02* (2012.01)

(52) U.S. Cl.
CPC ..... *G06Q 10/08345* (2013.01); *G06Q 10/087* (2013.01); *G06Q 30/0205* (2013.01);
(Continued)

(58) Field of Classification Search
CPC ........... G06Q 10/08345; G06Q 10/087; G06Q 30/0205; G06Q 30/0206; G06Q 30/0223; G06Q 30/0224
See application file for complete search history.

(56) References Cited

U.S. PATENT DOCUMENTS

| 2005/0060270 A1* | 3/2005 | Ramakrishnan ... | G06Q 30/0207 705/400 |
| 2010/0145773 A1* | 6/2010 | Desai ................. | G06Q 30/0201 705/7.29 |

(Continued)

OTHER PUBLICATIONS

Stephen A. Smith, Narendra Agrawal (2017), "Optimal Markdown Pricing and Inventory Allocation for Retail Chains with Inventory Dependent Demand". Manufacturing & Service Operations Management 19(2):290-304. (Year: 2017).*

(Continued)

*Primary Examiner* — George Chen
*Assistant Examiner* — Wayne S. Murray
(74) *Attorney, Agent, or Firm* — Kraguljac Law Group, LLC (57) ABSTRACT

Systems, methods, and other embodiments associated with controlling inventory depletion by offering different prices to different customers are described. In one embodiment, a method includes establishing first and second allocations of fulfillment centers to different geographic regions during a markdown phase. Different price schedules are determined for the orders to be fulfilled during the markdown phase based on the first and second allocations. A predicted profit is generated for the orders fulfilled under each of the different price schedules. A price schedule corresponding to the first allocation is selected as resulting in a greater predicted profit than another one of the different price schedules. A sale terminal is controlled to enact the selected price schedule during the markdown phase to cause fulfillment of the incoming orders according to the first allocation of the fulfillment centers.

11 Claims, 4 Drawing Sheets

(52) U.S. Cl.
CPC ..... *G06Q 30/0206* (2013.01); *G06Q 30/0223* (2013.01); *G06Q 30/0224* (2013.01)

(56) References Cited

U.S. PATENT DOCUMENTS

| | | | | |
|---|---|---|---|---|
| 2013/0073341 | A1* | 3/2013 | Vakhutinsky | G06Q 30/0283 705/7.35 |
| 2014/0149183 | A1* | 5/2014 | Liu | G06Q 30/0206 705/7.35 |
| 2017/0228812 | A1* | 8/2017 | Brereton | G06Q 30/0635 |

OTHER PUBLICATIONS

Oracle, Bridging the Gap Between Commerce & Marketing; 2015—pp. 1-6, downloaded from: https://www.oracle.com/marketingcloud/content/documents/whitepapers/bridging-the-map-marketing-commerce-wp-oracle.pdf.

* cited by examiner

SYSTEM AND METHOD FOR CONTROLLING INVENTORY DEPLETION BY OFFERING DIFFERENT PRICES TO DIFFERENT CUSTOMERS

CROSS REFERENCE TO RELATED APPLICATIONS

This disclosure claims the benefit of U.S. Provisional Patent Application Ser. No. "62/576,289" filed Oct. 24, 2017, titled "METHOD AND SYSTEM FOR OPTIMIZING MARK-DOWN PRICING IN ON-LINE RETAILING BY OFFERING DIFFERENT PRICES TO DIFFERENT CUSTOMER SEGMENTS", inventors: Su-Ming WU and Andrew VAKHUTINSKY, and assigned to the present assignee, which is incorporated by reference herein in its entirety.

BACKGROUND

Products enter the so-called "markdown phase" as they approach the discontinuance date. The inventory of a product in the markdown phase is not replenished as sales occur for the rest of its lifecycle. Markdown discounts that are too deep can cause the remaining inventory of a product to be exhausted before the discontinuance date on which sales of the product are to end, resulting in lost revenue for the retailer. On the other hand, markdown discounts that are too shallow cause units of the product to remain in inventory on the discontinuance date. These remaining units of the product in stock at this time are salvaged through secondary channels at an extremely low price, which also results in lost revenue.

Distribution of a product's inventory across several fulfillment centers further complicates the process of exhausting the remaining inventory. Different fulfillment centers typically exhaust their inventories of the product at different rates. For example, a first fulfillment center may have nearly exhausted its supply of a product, while a second fulfillment center maintains a surplus of the product. However, offering a uniform discount on the product across all fulfillment centers may prematurely exhaust the supply of the product at the first fulfillment center well before the discontinuance date for the product. Subsequent orders for the product submitted by customers located near the first fulfillment center are then fulfilled by the second fulfillment center. However, the second fulfillment center may be located in a different geographic region than the first fulfillment center, and may be located much further from the customer than the first fulfillment center. Thus, the cost to ship the product to customer from the second fulfillment center is higher than the cost to ship the product would have been from the first fulfillment center. Again, the fixed discount approach to exhausting the inventory of a product leads to lost revenue for the retailer.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Systems and methods are described herein that control inventory depletion by offering different discounted prices to different customers. Markdown pricing has been extensively studied and implemented in case of brick-and-mortar retailers. Such retailers offer the same price to all store customers at any given time and location.

On-line retailers occasionally charge different customers different prices for the same product. Such discounted prices reflect the price sensitivity of different customers, and can be applied to regular pricing of products that are replenished on a regular basis. However, significant sales occur for products that are approaching the end of their sales life. Products approaching the end of their sales life are scheduled to be removed from the warehouse or sales floor by a discontinuance date to clear space for new products.

Online retail sales present unique opportunities for personalized discounts. Variable pricing for the same product can be offered to different customers during a markdown phase. However, the inventory of products sold online are located at multiple geographically dispersed fulfillment centers. Higher shipping rates may be incurred by vendors such as online retailers to ship products purchased online to remote customers, and negatively impact the sales profit. Thus, markdown pricing in the context of online retail sales during a markdown phase can include load balancing among the fulfillment centers. Such markdown pricing minimizes the chance that a particular fulfillment center fully depletes its inventory before another fulfillment center. In other words, the demand expected to be fulfilled from any fulfillment center should not exceed the amount of its inventory, which can be achieved by coherent pricing and customer assignment policy.

Manual approaches to customize markdown prices during the markdown phase are not feasible for online retailers. The large number of items offered for sale would require a prohibitive amount of time to discount, even once. Further, such an approach would not take into consideration inventory levels at different fulfillment centers. Since discounts may deplete the inventory of products at different fulfillment centers at different rates, the inventory at one fulfillment center may be exhausted prematurely, while excess inventory remains at another fulfillment center. As a result, initial markdown pricing must be updated multiple times during the markdown phase, worsening the burden of manual approaches.

Existing automated markdown approaches are similar to the markdown approaches utilized by brick-and-mortar stores. A uniform markdown is offered uniformly to all customer groups, at all geographic locations within a sales region. Such markdown optimization approaches utilize only a single price curve to determine the markdown price. Load balancing between fulfillment centers is not considered. Instead, product inventory is assumed to be centrally supplied without differentiation among multiple fulfillment centers. These automated approaches also fail to take into consideration the price sensitivity of customers. Again, the result can be fully exhausting the inventory at one fulfillment center prematurely, while excess inventory remains at another fulfillment center.

Customer-group specific pricing and the allocation of fulfillment centers to customer groups can improve, and optionally maximize the profit resulting from online sales during the markdown phase. The present disclosure describes improvements in custom markdown pricing for a plurality of geographically-distributed customer groups, and controlling order fulfillment from a plurality of different fulfillment centers. The different fulfillment centers may incur different fulfillment service costs, to fulfill an order for the same product.

Generally, information identifying a plurality of geographic regions is received by the inventive computing system. Demand model parameters defining a plurality of customer groups can also be received. Each of the geographic regions can be classified as belonging to one of the customer groups. The customer groups reflect the willingness-to-pay, or price sensitivity, of customers within the geographic regions when considering whether to buy a product.

Information about the location of a plurality of fulfillment centers is retrieved from a database. The fulfillment centers are allocated to the different geographic regions, to fulfill orders for products submitted within those regions. A variety of factors can be considered in allocating the fulfillment centers to the geographic regions, such as:

a quantity of an ordered product at the fulfillment centers,
proximity of the fulfillment centers to their respective geographic regions, or
shipping costs for deliveries originating at the fulfillment centers, etc.

Once the fulfillment centers are allocated to fulfill orders placed in the different geographic regions, a price schedule can be determined for a product that can be ordered via an online marketplace. The price schedule includes a different discounted price, also referred to herein as a markdown price, that at least two of the customer groups used to classify the geographic regions are to be charged for a product. The different prices can be based, at least in part, on:

the price sensitivity of the different customer groups,
the remaining inventory of the product at the fulfillment centers allocated to the geographic regions, and
the cost of shipping the product from the fulfillment centers to the geographic regions (optionally limited to the portion of the shipping cost to be incurred by the online retailer).

The expected profit of the online retailer as a result of sales of the product in the geographic regions is generated. The expected profit can be generated based on anticipated sales of the product according to the prices for the geographic regions included in the price schedule. A data structure is generated to include the expected profit for the present iteration.

At least a second iteration of the above procedure, and optionally additional iterations as needed, can be performed. For each iteration, the allocation of the fulfillment centers to the geographic regions can be modified. Thus, the allocation established as part of the first iteration is different than the allocation of fulfillment centers to fulfill orders for the geographic regions as part of the second iteration. Just as with the first iteration, the allocation for the second, or subsequent iteration can optionally be based the inventory of the product remaining at each of the fulfillment centers. For example, a fulfillment center with a relatively large inventory can be allocated to fulfill orders placed in a greater number of geographic regions than a fulfillment center having a relative small inventory of the product. As another example, a fulfillment center with a relatively large inventory of a product can be allocated to fulfill orders placed in geographic regions with customers that are not price sensitive (e.g., willing to pay a high price), and a fulfillment center with a relatively small inventory can be allocated to geographic regions with customers that are price sensitive (e.g., unwilling to pay more than a substantially-discounted price).

The price schedule for the allocation of the second iteration is then determined, and the expected profit of the online retailer as a result of sales of the product according to the modified allocation and price schedule is generated. The price schedule and the corresponding allocation of fulfillment centers of the iteration that yielded the greater expected profit is selected. The data structure can be modified to reflect the selected price schedule and allocation of fulfillment centers that generated the greatest profit during the markdown phase.

The data structure can be transmitted over a communication network by the computing system to a sale terminal. The transmitted data structure controls operation of the sale terminal, causing the sale terminal to offer customers the appropriate markdown prices of a product during the markdown phase. For example, the sale terminal can be embodied as an online retail transaction server that hosts an online retail marketplace where products can be purchased or paid for. The price schedule included in the data structure can be referenced by the sale terminal when a customer requests a price of a product at the online retail marketplace. Based on the geographic location of the customer, and optionally the customer group in which the geographic location is classified, the markdown price can be returned to the customer during the markdown phase. Thus, the markdown price can be specific to the customer in the geographic location or the customer group. The customer-specific markdown price can differ from the markdown price offered to customers in different geographic locations classified in different customer groups.

Figure 1:
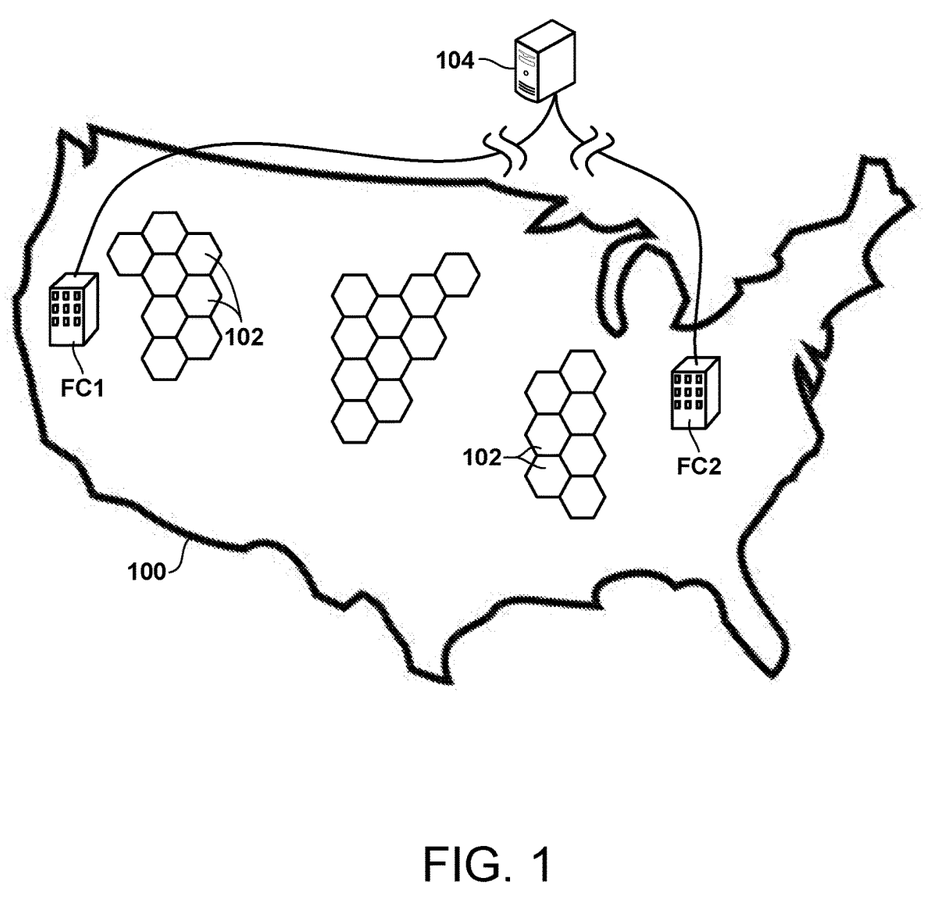
FIG. 1 illustrates one embodiment of a sales region divided into a plurality of different geographic regions categorized into one of a plurality of different customer groups.

With reference to FIG. 1, one embodiment of a sales region 100 broken up into a plurality of different geographic regions 102 is shown. For the illustrative example, the sales region 100 includes the 48 contiguous states of the United States. The sales region 100 can be divided into a plurality of different geographic regions 102 based on any criteria that results in a defined number of geographic regions 102 that is manageable for the present techniques. According to one embodiment, the geographic regions 102 can be defined as areas having a zip code that begins with the same first two digits. Using the first two digits of the zip code forms approximately 100 different geographic regions 102, however, the sales region 100 can include any desired number of geographic regions 102.

FIG. 1 also shows a plurality of fulfillment centers FC1, FC2. Each fulfillment center FC1, FC2 includes a warehouse or other storage facility in which an inventory of a product is maintained. The fulfillment centers FC1, FC2 collectively fulfill orders submitted at the online marketplace within the sales region 100, but can each separately be allocated to fulfill orders in different geographic regions 102. Although two fulfillment centers FC1, FC2 are shown in FIG. 1 and used to describe the present technology below, any number of fulfillment centers FC1, FC2 can be allocated in accordance with the present disclosure.

The geographic regions 102 can be classified as falling into one of a plurality of different customer groups. Each customer group reflects the willingness-to-pay, or price sensitivity, of customers who purchase the product within the respective geographic region 102. For example, the customer groups can be based on income information, such as the median income within a geographic region 102, credit rating, etc.

According to one embodiment, the customer groups can be based on historical spending data for customers in the geographic region 102, obtained by the vendor operating the online marketplace, or collected by a third party. The historical spending data can include at least one of: a total dollar amount spent on online purchases, an average purchase price paid for online purchases, information about discounts on online purchases by customers within a geographic region 102, or any other historical spending data.

A sale terminal 104 controlled according to the price schedules and fulfillment center allocation generated herein is operably connected to the fulfillment centers FC1, FC2. The sale terminal 104 can be a server that hosts the online marketplace or payment portal, for example. According to another embodiment, the sale terminal 104 can be any other computer terminal that conveys order information to at least one of the fulfillment centers FC1, FC2. In response to receiving the order information, the fulfillment center FC1, FC2 allocated to the geographic region 102 in which the order was submitted ships the ordered product in fulfillment of the order.

Figure 2:
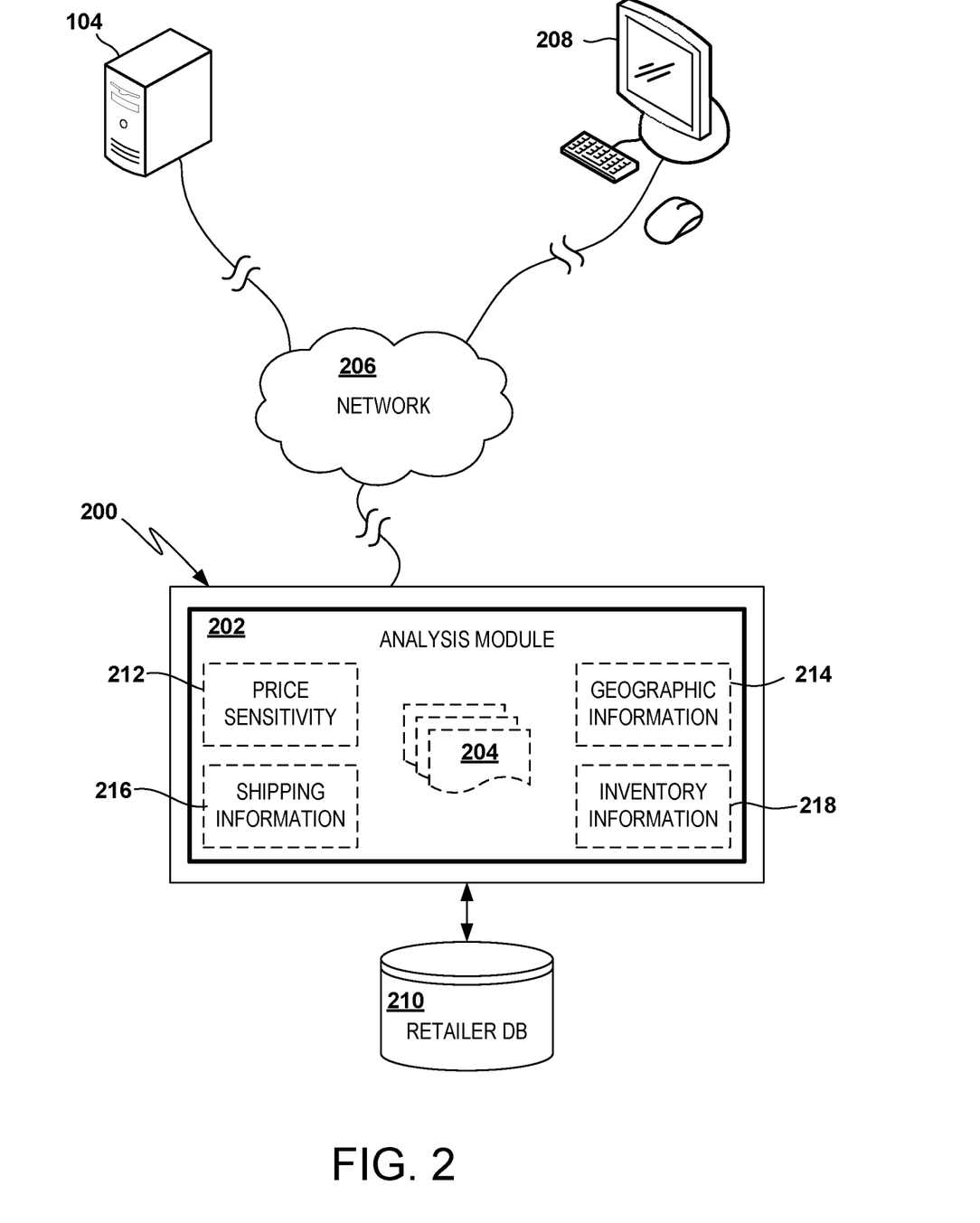
FIG. 2 illustrates one embodiment of a markdown system for allocating fulfillment centers to geographic regions and generating a markdown price schedule for the different geographic regions.

FIG. 2 illustrates one embodiment of a markdown system 200 for allocating fulfillment centers FC1, FC2 to geographic regions 102, and generating a markdown price schedule for the different geographic regions 102. The markdown system 200 includes an analysis module 202 that receives demand model parameters, and optimizes the allocation and markdown price schedule in terms of expected profit to the online retailer. The allocation and markdown price schedule generated by the analysis module 202 as described herein is stored in a data structure 204, and transmitted to the sale terminal 104 over a communication network 206. Operation of the sale terminal 104 to cause fulfillment of sales transactions submitted by a customer terminal 208 accessing an online marketplace is controlled by the content of the data structure 204.

The information utilized by the analysis module 202 to create the data structure 204 can be stored by a retailer database 210. The information stored by the retailer database 210 can include historical spending data collected by the retailer or vendor operating the online marketplace, or obtained from a third party. For instance, the analysis module can retrieve price sensitivity information 212 from the retailer database 210. The customer information 212 can be utilized to classify the geographic regions 102 into one of a defined number of customer groups. Such a classification can be based on income information, such as the median income within a geographic region 102, credit rating, etc.

According to another embodiment, the customer groups can be defined based on historical spending data for customers in the geographic region 102, obtained by the vendor operating the online marketplace, or collected by a third party. The historical spending data can include at least one of: a total dollar amount spent on online purchases, an average purchase price paid for online purchases, information about discounts on online purchases by customers within a geographic region 102, or any other historical spending data.

Geographic information 214 can also be accessed from the retailer database 210, or optionally from a third party over the communication network 206. The geographic information 214 defines the limits separating the different geographic regions 102 from each other.

Shipping information 216 stored by, and accessible from the retailer database 210 can include vendor-specific shipping terms. Vendors operating high-volume online marketplaces may negotiate favorable shipping rates from couriers and delivery service providers. Further, vendors may subsidize a portion, and optionally all of the shipping costs to fulfill an order for a product. The shipping information 216 may also include shipping terms that define what portion, if any, of the shipping cost for an order or product is to be absorbed by the vendor that is selling the product.

Inventory information 218 received by the analysis module 202 is indicative of the remaining inventory of products in stock at the fulfillment centers FC1, FC2. The inventory information 218 can be received over the communication network from the sale terminal 104, or retrieved from the retailer database 210.

Figure 3:
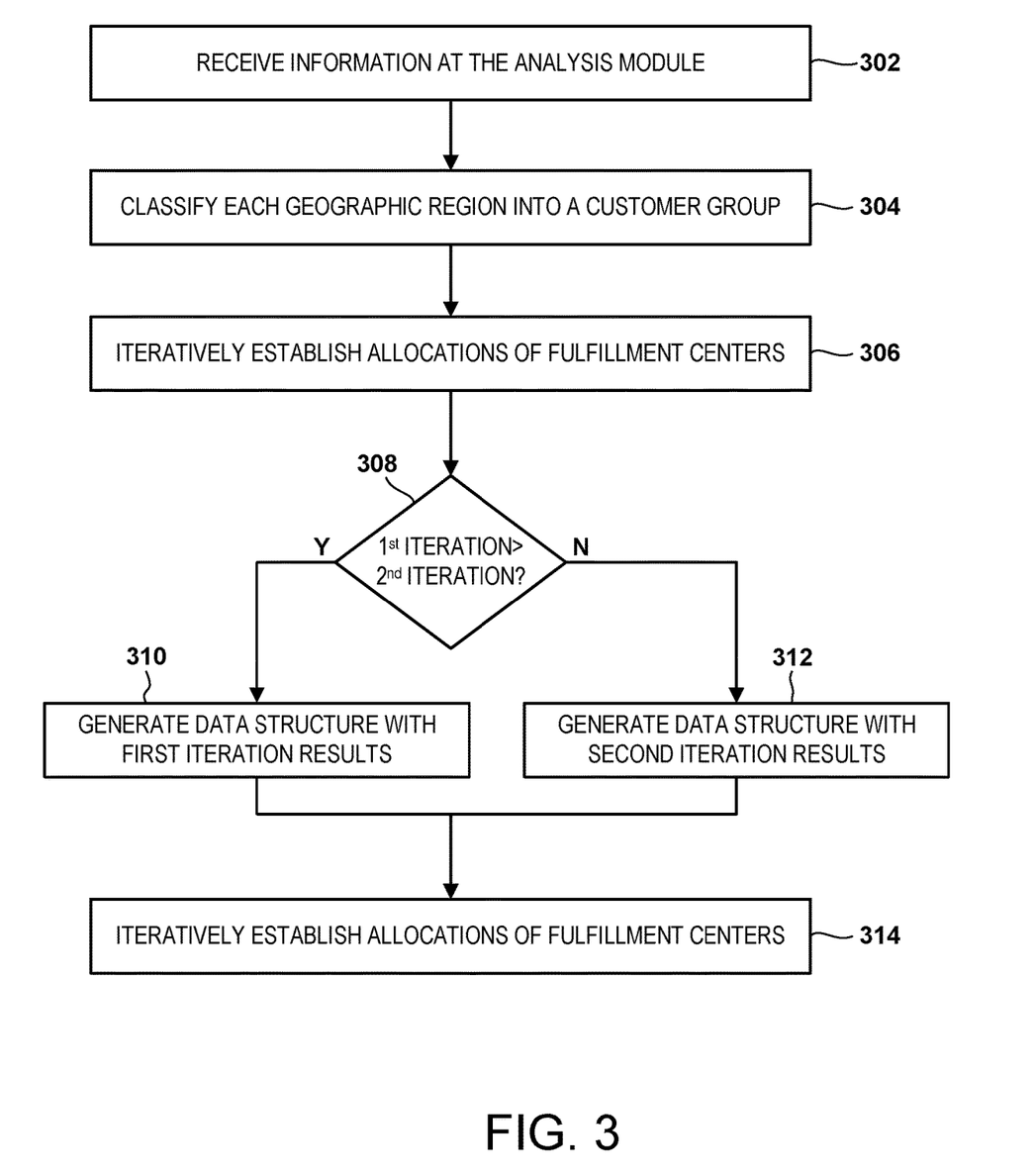
FIG. 3 illustrates an embodiment of a method of controlling inventory depletion during a markdown phase at a plurality of fulfillment centers by offering different prices to different customers.

A method 300 of controlling inventory depletion at a plurality of fulfillment centers FC1, FC2 by offering different prices to different customers is illustrated in FIG. 3. The method is based on the assumption that products entering or approaching the markdown phase are not replenished. For purposes of describing the method 300, a first fulfillment center FC1 (FIG. 1) is located in California, and a second fulfillment center FC2 is located in Ohio. The inventory of the product maintained at each fulfillment center FC1, FC2 in the markdown phase is not replenished as sales occur for the rest of the product's lifecycle.

Method 300 may be performed by the analysis module 202 of the markdown system 200. The method 300 can be initiated occasionally, such as periodically (e.g., once every seven days, once a month, etc.) during the markdown phase, in response to a defined number of orders for the product being submitted and fulfilled during the markdown phase, in response to depletion of the inventory below a threshold level, or in response to a request submitted via the communication network 206.

Regardless of how the method 300 is initiated, price sensitivity information 212, geographic information 214, shipping information 216 and inventory information 218 are received by the analysis module 202 at block 302. For example, the price sensitivity information 212 can be received from a third-party data provider, and optionally supplemented with historical spending data collected by the vendor and stored in the retailer database 210.

The geographic information 214 can include a collection of zip codes having a unique combination the first two digits. The geographic information 214 can be retrieved from the retailer database 210, or obtained over the communication network 206 from a remote database such as that operated by a mapping service provider, for example. The geographic information 214 is used in conjunction with the price sensitivity information 212, at block 304, to classify each geographic region 102 into one of a plurality of (e.g., five)

different customer groups. Each customer group reflects the price sensitivity of customers located in the respective geographic region 102.

The received shipping information 216 defines shipping charges for delivery of the product from each of the fulfillment centers FC1, FC2, to each of the different geographic regions 102. The analysis module 202 can optionally be configured to limit the received shipping charges to charges that are to be incurred by a vendor or retailer of the product.

The inventory information 218 is indicative of the quantity of the product in stock at each fulfillment center FC1, FC2, and available to ship in fulfillment of orders placed at the online market place. The inventory information 218 can be stored by the retailer database 210, and updated in real time as units of the product are shipped in fulfillment of orders. Thus, when the inventory information 218 is accessed during performance of the present method, the inventory information 218 is substantially up to date.

At block 306, the analysis module 202 establishes a plurality of different allocations of the fulfillment centers FC1, FC2 to the different geographic regions 102/customer groups. At least first and second allocations of the fulfillment centers FC1, FC2 to fulfill orders for a product to be delivered to, or submitted from within the different geographic regions 102 are established. The first and second allocations can be established based, at least in part, on the inventory information 218. For example, fulfillment center FC1 may have a larger inventory of a product than fulfillment center FC2. It is desired to deplete the large inventory of fulfillment center FC1 faster than the small inventory of fulfillment center FC1 so the inventory of each fulfillment center FC1, FC2 approaches zero as the sales lifecycle of the product ends. Thus, fulfillment center FC1 can be allocated to supply the product in fulfillment of orders to a greater number of geographic regions 102 than fulfillment center FC2. However, other factors such as shipping costs to be incurred by shipping from each fulfillment center FC1, FC2, and other factors can influence the allocation of the fulfillment centers FC1, FC2 to the geographic regions 102.

According to one embodiment, a computationally tractable approach to allocating the fulfillment centers FC1, FC2 to the geographic regions 102 can be adopted. For example, the decision variables utilized to allocate the fulfillment centers FC1, FC2 can be broken down into a plurality of subsets. Each subset can be solved for a desired, and optionally an optimal value of a specific variable in random order. Decision variables other than the specific variable being solved for as part of a subset are held constant. Such an approach is referred to herein as randomized decomposition ("RD"). RD can be combined with a large neighborhood search metaheuristic to create complete solution framework, called "RDSolver." RDSolver is a general purpose, non-linear, non-convex discrete solver for solving mathematical programs. RDsolver can solve non-linear objective functions, so it is not necessary to linearize the sub-model, or the overall model from which the sub-models were derived, being solved.

The input to RDsolver includes the parameters of the demand model specified for each: (i) customer group, (ii) shipping/service cost between each fulfillment center FC1, FC2 and each geographic location 102, (iii) inventory level at each fulfillment center FC1, FC2, and (iv) the end of the product's lifecycle (e.g., the discontinuance date). The decision variables can be divided into two groups: allocation of fulfillment centers FC1, FC2 to different geographic regions/ customer groups, and the markdown prices to be determined with the objective of maximizing the expected profit.

The demand model can be solved in an iterative fashion. At each iteration, a new allocation of fulfillment centers FC1, FC2 to geographic locations 102/customer groups is established. For each allocation, the problem of optimal pricing for each customer group is solved given the inventory amount at each fulfillment center FC1, FC2, and the geographic regions 102/customer groups to which the fulfillment centers FC1, FC2 are allocated. As a result of solving the multi-customer markdown optimization models, a price curve specific to each geographic location 102/ customer group can be created. The price curve reflects the periodic (e.g., weekly) price changes planned for each geographic region 102/customer group until the discontinuance date.

A model such as that described above to allocate the fulfillment centers FC1, FC2 to the geographic regions 102 is a function of two variables: (i) the customer group in which the geographic regions 102 are classified, and (ii) a markdown price schedule of prices to be charged for the product in the different geographic regions 102. A sub-model to be solved to allocate the fulfillment centers FC1, FC2 based on the customer group can be generated, assuming a constant markdown price. Also, a sub-model to be solved to allocate the fulfillment centers FC1, FC2 based on the markdown price, assuming a constant customer group can be generated. Each sub-model can be solved, simultaneously or separately, to obtain the optimal value of the respective variable as part of an iterative process.

Other embodiments of the model can be a function of any number of other variables such as shipping charges from each fulfillment center FC1, FC2 to the geographic regions 102, for example. A sub model is to be derived for each variable of the overall model. The variable is solved based on each sub model, holding the other variables constant.

For each iteration, the predicted profit from orders fulfilled under the respective allocation of fulfillment centers FC1, FC2, and according to the respective markdown price schedule, are compared at decision 308. If the predicted profit based on the first allocation and markdown price schedule exceeds the predicted profit based on the second allocation and markdown price schedule, first allocation and markdown price schedule are selected at block 310. A data structure 204 including the first allocation and markdown price schedule is generated.

If, at decision 308, the predicted profit based on the first allocation and markdown price schedule does not exceed the predicted profit based on the second allocation and markdown price schedule, the second allocation and markdown price schedule are selected at block 312. A data structure 204 including the second allocation and markdown price schedule is generated.

The data structure 204 generated is transmitted by the analysis module 202 at block 314 to the sale terminal 104, over the communication network 206. The transmitted data structure 204 controls the sale terminal 104, causing the sale terminal 104 to enact the allocation and price schedule included in the data structure 204. For example, if the data structure 204 includes the first allocation and markdown price schedule, the sale terminal 104 modifies the online marketplace accordingly. A customer places an order for a product over the communication network 206 using the customer terminal 208. The order is routed to the sale terminal 104 which, in response, transmits content used by the customer terminal 208 to present the product for sale at the price specified by the first markdown price included in the data structure 204. The price presented depends on the geographic region 102/customer group to which the customer terminal belongs 208.

When the customer submits the order, the sale terminal 104 forwards the order to the fulfillment center FC1, for example, that was specified in the data structure 204. The fulfillment center FC1 prepares and ships the product to the customer in the customer's geographic region 102.

In one embodiment, the markdown system 200 is a computing/data processing system including an application or collection of distributed applications for enterprise organizations. The applications and markdown system 200 may be configured to operate with or be implemented as a cloud-based networking system, a software as a service (SaaS) architecture, or other type of networked computing solution. In one embodiment the markdown system 200 is a centralized server-side application that provides at least the functions disclosed herein and that is accessed by many users via computing devices/terminals communicating with the markdown system 100 (functioning as the server) over the computer network 206.

In one embodiment, one or more of the components described herein (e.g., analysis module) are configured as program modules stored in a non-transitory computer readable medium. The program modules are configured with stored instructions that when executed by at least a processor cause the computing device to perform the corresponding function(s) as described herein.

Computing Device Embodiment

Figure 4:
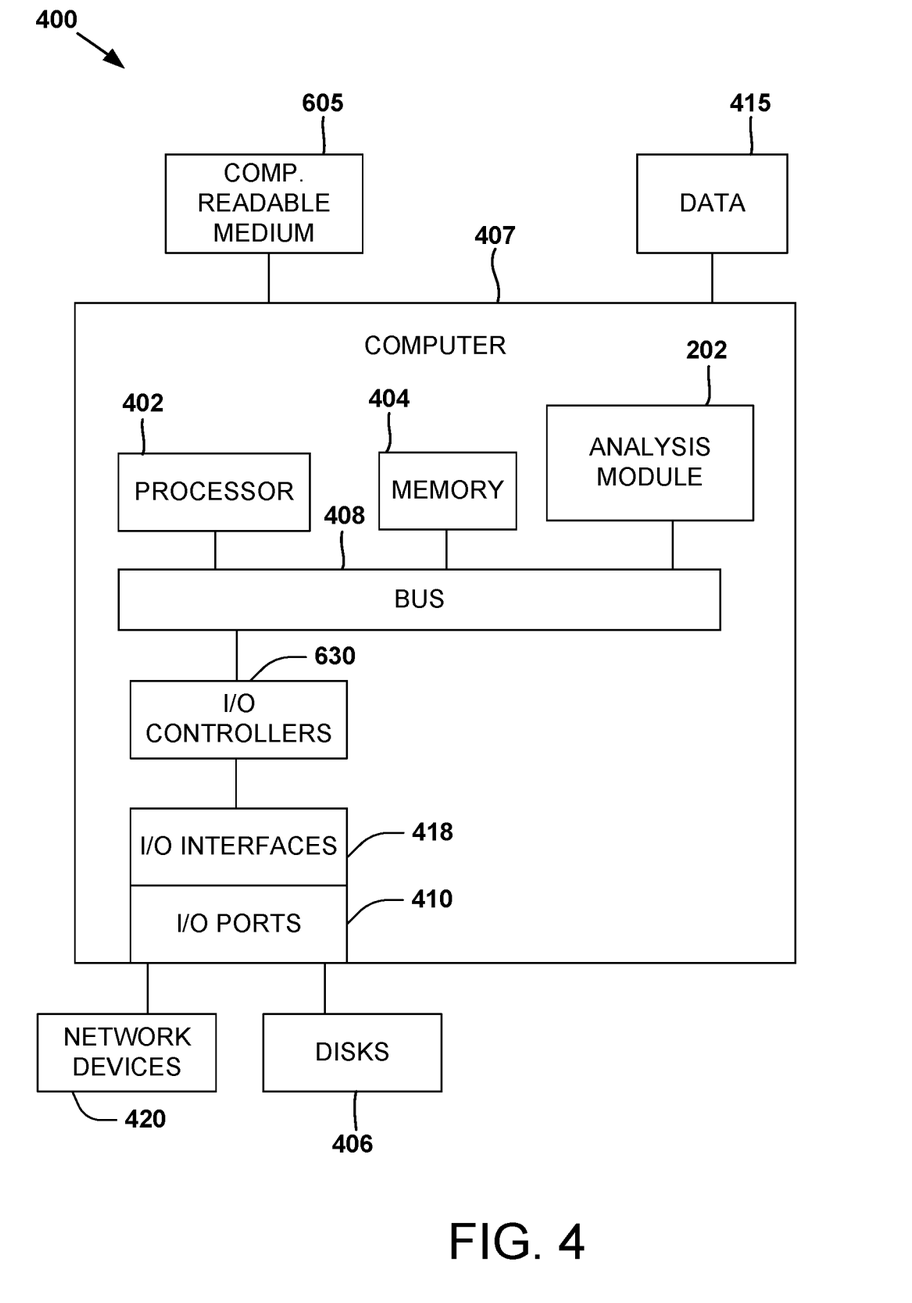
FIG. 4 illustrates an embodiment of a computing system configured with the example systems and/or methods disclosed.

FIG. 4 illustrates an example computing system 400 that is configured and/or programmed with one or more of the example systems and methods described herein, and/or equivalents. The example computing system may be a computer 407 that includes a processor 402, a memory 404, and input/output ports 410 operably connected by a bus 408. In one example, the computer 407 may include logic embodying the analysis module 202 configured to facilitate a method of inventory depletion that is a function of at least one of a geographic location, customer price sensitivity, product inventory, or shipping charges, to maximize profit, similar to the markdown system 200 shown in FIG. 2. In different examples, the logic of the analysis module 202 may be implemented in hardware, a non-transitory computer-readable medium with stored instructions, firmware, and/or combinations thereof. While the logic of the analysis module 202 is illustrated as a hardware component attached to the bus 408, it is to be appreciated that in other embodiments, the logic of the analysis module 202 could be implemented in the processor 402, stored in memory 404, or stored in disk 406.

In one embodiment, logic of the analysis module 202 or the computer 407 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to control inventory depletion during a markdown phase to optimize profit as described herein. The means may also be implemented as stored computer executable instructions that are presented to computer 407 as data 415 that are temporarily stored in memory 404 and then executed by processor 402.

Logic of the analysis module 202 may also provide means (e.g., hardware, non-transitory computer-readable medium that stores executable instructions, firmware) for performing a method of depleting inventory by offering different discounts to different customers with an objective of optimizing profit as described herein.

Generally describing an example configuration of the computer 407, the processor 402 may be a variety of various processors including dual microprocessor and other multi-processor architectures. A memory 404 may include volatile memory and/or non-volatile memory. Non-volatile memory may include, for example, ROM, PROM, and so on. Volatile memory may include, for example, RAM, SRAM, DRAM, and so on.

A storage disk 406 may be operably connected to the computer 407 via, for example, an input/output (I/O) interface (e.g., card, device) 418 and an input/output port 410. The disk 406 may be, for example, a magnetic disk drive, a solid state disk drive, a floppy disk drive, a tape drive, a Zip drive, a flash memory card, a memory stick, and so on. Furthermore, the disk 406 may be a CD-ROM drive, a CD-R drive, a CD-RW drive, a DVD ROM, and so on. The memory 404 can store a process and/or a data 415, for example. The disk 406 and/or the memory 404 can store an operating system that controls and allocates resources of the computer 407.

The computer 407 may interact with input/output (I/O) devices via the I/O interfaces 418 and the input/output ports 410. Input/output devices may be, for example, a keyboard, a microphone, a pointing and selection device, cameras, video cards, displays, the disk 406, the network devices 420, and so on. The input/output ports 410 may include, for example, serial ports, parallel ports, and USB ports.

The computer 407 can operate in a network environment and thus may be connected to the network devices 420 via the I/O interfaces 418, and/or the I/O ports 410. Through the network devices 420, the computer 407 may interact with a network such as communication network 206. Through the network, the computer 407 may be logically connected to remote computers. Networks with which the computer 407 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User" or "customer," as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that, when executed by at least a processor of a computing system, cause the computing system to:

receive product discontinuance date information and inventory allocation information indicative of a remaining quantity of a product in stock at each of a plurality of fulfillment centers;

wherein the inventory allocation information of each of a plurality of fulfillment centers is at least based upon (i) a quantity of the product currently at each of the plurality of fulfillment centers, (ii) a proximity of each of the plurality of fulfillment centers to a particular geographic region from a plurality of geographic regions, and (iii) shipping costs for deliveries originating at each of the plurality of fulfillment centers;

wherein each of the plurality of geographic regions is based upon a different customer group and a price sensitivity of customers in the customer group to purchase the product within each of the plurality of geographic regions;

establish, by at least the processor, (i) a first inventory allocation of a remaining amount of the product at each of the fulfillment centers to fulfill orders for delivery of the product to different geographic regions during a markdown phase, and (ii) a second inventory allocation of the remaining amount of the product at each of the fulfillment centers to fulfill the orders for delivery of the product to the different geographic regions during the markdown phase, wherein the first inventory allocation is different from the second inventory allocation, and wherein the first and second inventory allocations are based upon the received product discontinuance date information and the inventory allocation information;

generate, for each of the first and second inventory allocations, a price curve that is specific for each of the different geographic regions, wherein the price curve reflects periodic price changes planned for a corresponding geographic region until the product discontinuance date;

wherein the price curve is based upon the price sensitivity of the customer group associated with each of the different geographic regions, the quantity of the product currently at each of the plurality of fulfillment centers, and the shipping costs for deliveries originating at each of the plurality of fulfillment centers to each of the different geographic regions;

determine, by at least the processor, different price schedules for the orders to be fulfilled during the markdown phase based on the first inventory allocation and the second inventory allocation, wherein each different price schedule is based upon the price curve that is specific for the customer group in each of the different geographic regions;

generate, by at least the processor, a predicted profit from the orders fulfilled under each of the different price schedules;

select, by at least the processor, a price schedule corresponding to the first inventory allocation as resulting in a greater predicted profit than another one of the different price schedules;

modify the selected price schedule based on the received product discontinuance date information and the inventory allocation information to control operation of a sale terminal in a manner that promotes balanced depletion of the quantity of the product in stock across each of the fulfillment centers;

generate a data structure, wherein the data structure includes the first inventory allocation and the modified price schedule;

forward the data structure to a sale terminal;

control, by at least the processor, operation of the sale terminal to enact the selected price schedule for incoming orders placed during the markdown phase and cause fulfillment of the incoming orders according to the data structure, wherein a price from the selected price schedule is applied to the incoming order based upon the geographic region from which the incoming order is associated; and cause the fulfillment centers to prepare the incoming order and ship a product associated with the incoming order to a customer in a customer's geographic region.

2. The non-transitory computer-readable medium of claim 1, further comprising instructions that, when executed by at least the processor, cause the computing system to limit the received shipping charges to charges that are to be incurred by a vendor of the product.

3. The non-transitory computer-readable medium of claim 1, wherein the price sensitivity information is based on historical spending data of customers within the different geographic regions.

4. The non-transitory computer-readable medium of claim 1, wherein the selected price schedule for the first inventory allocation of the fulfillment centers includes a shipping charge for fulfilling an order from a first fulfillment center that is greater than an alternate shipping charge for fulfilling the order from a second fulfillment center.

5. A computing system, comprising:

at least one processor connected to at least one memory; and an analysis module stored on a non-transitory computer readable medium and including instructions that when executed by at least the processor cause the processor to:

receive product discontinuance date information and inventory allocation information indicative of a remaining quantity of a product in stock at each of a plurality of fulfillment centers;

wherein the inventory allocation information of each of a plurality of fulfillment centers is based upon (i) a quantity of the product currently at each of the plurality of fulfillment centers, (ii) a proximity of each of the plurality of fulfillment centers to a particular geographic region from a plurality of geographic regions, and (iii) shipping costs for deliveries originating at each of the plurality of fulfillment centers;

wherein each of the plurality of geographic regions is based upon a different customer group and a price sensitivity of customers in the customer group to purchase the product within each of the plurality of geographic regions;

establish: (i) a first inventory allocation of a remaining amount of the product at each of the fulfillment centers to fulfill orders for delivery of the product to different geographic regions during a markdown phase, and (ii) a second inventory allocation of the remaining amount of the product at each of the fulfillment centers to fulfill the orders for delivery of the product to the different geographic regions during the markdown phase, wherein the first inventory allocation is different from the second inventory allocation, and wherein the first and second inventory allocations are based upon the received product discontinuance date information and inventory allocation information;

generate, for each of the first and second inventory allocations, a price curve that is specific for each of the different geographic regions, wherein the price curve reflects periodic price changes planned for a corresponding geographic region until the product discontinuance date,
wherein the price curve is based upon the price sensitivity of the customer group associated with each of the different geographic regions, the quantity of the product currently at each of the plurality of fulfillment centers, and the shipping costs for deliveries originating at each of the plurality of fulfillment centers to each of the different geographic regions;
determine, by at least the processor, different price schedules for the orders to be fulfilled during the markdown phase based on the first inventory allocation and the second inventory allocation, wherein each different price schedule is based upon the price curve that is specific for the customer group in each of the different geographic regions;
generate a predicted profit from the orders fulfilled under each of the different price schedules;
select a price schedule corresponding to the first inventory allocation as resulting in a greater predicted profit than another one of the different price schedules;
modify the selected price schedule based on the received product discontinuance date information and the inventory allocation information to control operation of a sale terminal in a manner that promotes balanced depletion of the quantity of the product in stock across each of the fulfillment centers;
generate a data structure, wherein the data structure includes the first inventory allocation and the modified price schedule;
forward the data structure to a sale terminal;
control operation of the sale terminal to enact the selected price schedule for incoming orders placed during the markdown phase and cause fulfillment of the incoming orders according to the data structure,
wherein a price from the selected price schedule is applied to the incoming order based upon the geographic region from which the incoming order is associated; and
cause the fulfillment centers to prepare the incoming order and ship a product associated with the incoming order to a customer in a customer's geographic region.

6. The computing system of claim 5, wherein the analysis module further includes instructions that when executed by at least the processor cause the processor to limit the received shipping charges to charges that are to be incurred by a vendor of the product.

7. The computing system of claim 5, wherein the price sensitivity information is based on historical spending data of customers within the different geographic regions.

8. The computing system of claim 5, wherein the selected price schedule for the first inventory allocation of the fulfillment centers includes a shipping charge for fulfilling an order from a first fulfillment center that is greater than an alternate shipping charge for fulfilling the order from a second fulfillment center.

9. A computer-implemented method, the method comprising:
receive product discontinuance date information and inventory allocation information indicative of a remaining quantity of a product in stock at each of a plurality of fulfillment centers;
wherein the inventory allocation information of each of a plurality of fulfillment centers is based upon (i) a quantity of the product currently at each of the plurality of fulfillment centers, (ii) a proximity of each of the plurality of fulfillment centers to a particular geographic region from a plurality of geographic regions, and (iii) shipping costs for deliveries originating at each of the plurality of fulfillment centers;
wherein each of the plurality of geographic regions is based upon a different customer group and a price sensitivity of customers in the customer group to purchase the product within each of the plurality of geographic regions;
establishing: (i) a first inventory allocation of a remaining amount of the product at each of the fulfillment centers to fulfill orders for delivery of the product to different geographic regions during a markdown phase, and (ii) a second inventory allocation of the remaining amount of the product at each of the fulfillment centers to fulfill the orders for delivery of the product to the different geographic regions during the markdown phase, wherein the first inventory allocation is different from the second inventory allocation, and wherein the first and second inventory allocations are based upon the received product discontinuance date information and inventory allocation information;
generating, for each of the first and second inventory allocations, a price curve that is specific for each of the different geographic regions, wherein the price curve reflects periodic price changes planned for a corresponding geographic region until the product discontinuance date,
wherein the price curve is based upon the price sensitivity of the customer group associated with each of the different geographic regions;
determining different price schedules for the orders to be fulfilled during the markdown phase based on the first inventory allocation and the second inventory allocation, wherein each different price schedule is based upon the price curve that is specific for the customer group in each of the different geographic regions;
generating a predicted profit from the orders fulfilled under each of the different price schedules;
selecting a price schedule corresponding to the first allocation as resulting in a greater predicted profit than another one of the different price schedules;
modifying the selected price schedule based on the received product discontinuance date information and the inventory allocation information to control operation of a sale terminal in a manner that promotes balanced depletion of the quantity of the product in stock across each of the fulfillment centers;
generating a data structure, wherein the data structure includes the first inventory allocation and the modified price schedule;
forwarding the data structure to a sale terminal;
controlling operation of the sale terminal to enact the selected price schedule for incoming orders placed during the markdown phase and cause fulfillment of the incoming orders according to the data structure,
wherein a price from the selected price schedule is applied to the incoming order based upon the geographic region from which the incoming order is associated; and
causing the fulfillment centers to prepare the incoming order and ship a product associated with the incoming order to a customer in a customer's geographic region.

10. The method of claim 9, further comprising limiting the received shipping charges to charges that are to be incurred by a vendor of the product.

11. The method of claim 9, wherein the price sensitivity information is based on historical spending data of customers within the different geographic regions.

\* \* \* \* \*